Nov. 14, 1961   O. K. KELLEY ET AL   3,008,171
WINDSHIELD CLEANING APPARATUS
Original Filed Feb. 9, 1955
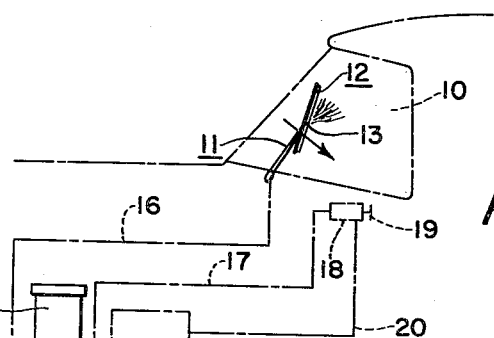
Fig. 1
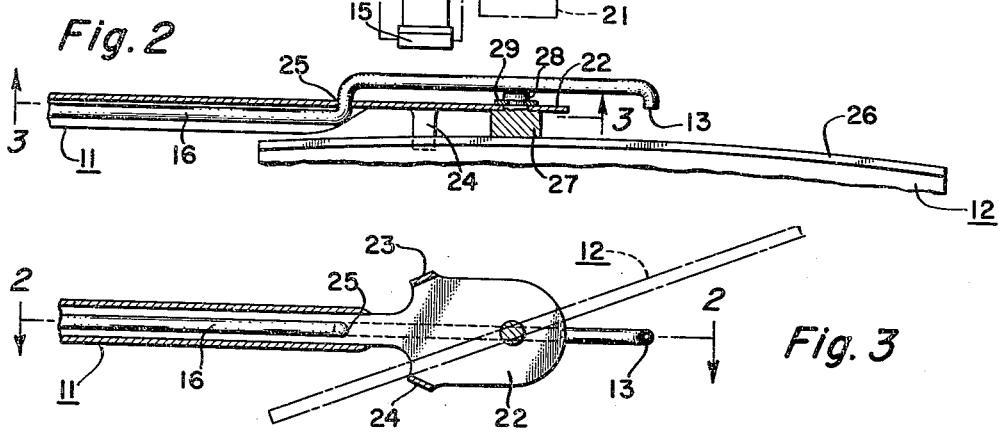
Fig. 2
Fig. 3
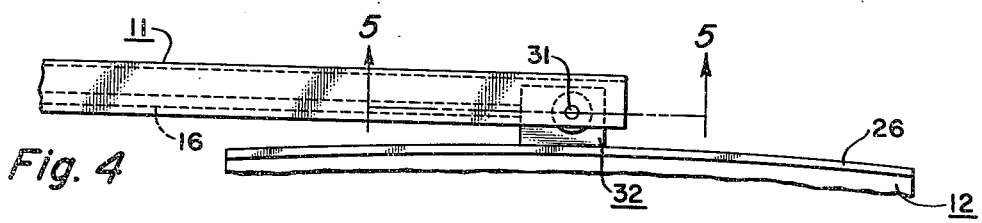
Fig. 4
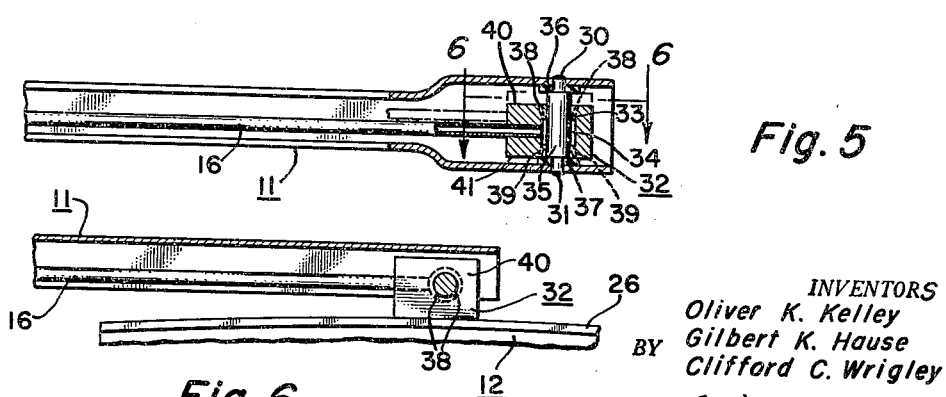
Fig. 5
Fig. 6
INVENTORS
Oliver K. Kelley
Gilbert K. Hause
BY Clifford C. Wrigley
Craig V. Morton
Their Attorney United States Patent Office 3,008,171
Patented Nov. 14, 1961

3,008,171
WINDSHIELD CLEANING APPARATUS
Oliver K. Kelley, Birmingham, Gilbert K. Hause, Franklin, and Clifford C. Wrigley, Grosse Pointe Woods, Mich., assignors to General Motors Corporation, Detroit, Mich., a corporation of Delaware
Original application Feb. 9, 1955, Ser. No. 487,033. Divided and this application May 6, 1959, Ser. No. 817,701
6 Claims. (Cl. 15—250.04)

This invention pertains to the art of windshield washing, and particularly to the construction and arrangement of the nozzles through which liquid solvent is discharged onto a vehicular transparency. This application is a division of Serial No. 487,033, filed February 9, 1955 and now abandoned.

In present day windshield washer apparatus, the discharge nozzles are mounted on the cowl portion of the vehicle in proximity to the windshield cleaner assemblies. Thus, the liquid solvent which is discharged therefrom always impinges substantially the same windshield area, and the wiper blades are employed to distribute the solvent and effect cleaning of the windshield. This system, while tolerable, leaves much to be desired. Accordingly, among our objects are the provision of a windshield washer arrangement wherein the liquid solvent is discharged immediately adjacent the wiper blades; the further provision of a washer arrangement wherein the solvent discharge always leads the blade movement; the further provision of a pivoted arm and blade assembly wherein the washer discharge nozzle is mounted on the arm for movement therewith; and the still further provision of a wiper arm and blade assembly wherein the washer discharge nozzle is mounted on the arm, and the blade is capable of limited transverse movement relative to the arm.

The aforementioned and other objects are accomplished in the present invention by positioning the washer discharge nozzle on the wiper arm adjacent its connection with the wiper blade. Specifically, two embodiments of the improved windshield washer nozzle arrangement are disclosed. In the preferred embodiment, the wiper blade is pivotally connected to the wiper arm at a point displaced from the center of the blade. The wiper arm includes a pair of spaced tangs, or ears, disposed on opposite sides of the blade. These tangs function to limit pivotal movement of the blade relative to the arm, which pivotal movement is caused by the unbalanced pivotal connection between the arm and blade. That is, the length of the wiper blade on one side of its pivotal connection with the arm is substantially greater than the length of the blade on the other side of the pivotal connection. In this manner, the longer end of the blade will lag behind the arm during oscillatory movement thereof.

The washer line is carried by the wiper arm, and the discharge nozzle therefor is located outwardly of the pivotal connection between the blade and the arm. Accordingly, during movement of the blade from the vehicle cowl towards the outboard stroke limit position thereof, the blade will pivot relative to the arm due to the frictional resistance to relative movement between the blade and the windshield, which is caused by the pressure applying means of the arm. Inasmuch as the longer end of the blade lags behind the arm while the discharge nozzle is in alignment with the arm, the discharge nozzle will always lead movement of the wiper blade, and the liquid solvent will be discharged immediately adjacent and forwardly of the blade throughout its oscillatory movement.

In another embodiment, the wiper arm and wiper blade are interconnected in a manner permitting limited transverse movement therebetween during reversal in the direction of blade and arm movement. The washer line carried by the arm terminates in a block having discharge nozzles, or jets, located on opposite end surfaces. The wiper blade is attached to the block, and the block is slidably supported on an arm carried pin. The pin carries a pair of spaces sealing washers, which constitute valves for alternately closing jets on oppoiste ends of the block. In operation, the jets leading the blade will be open during blade movement and the liquid solvent will be discharged immediately adjacent the blade throughout its oscillatory movement.

Further objects and advantages of the present invention will be apparent from the following description, reference being had to the accompanying drawing wherein preferred embodiments of the present invention are clearly shown, and wherein similar reference characters denote similar parts throughout the several views.

In the drawings:

FIGURE 1 is a schematic view of an automobile washer system embodying the present invention;

FIGURE 2 is a fragmentary view, partly in section and partly in elevation, of a modified nozzle arrangement, taken generally along line 2—2 of FIGURE 3;

FIGURE 3 is a fragmentary view, partly in section and partly in elevation, taken along line 3—3 of FIGURE 2;

FIGURE 4 is a fragmentary view, in elevation, of the preferred washer arrangement;

FIGURE 5 is a fragmentary sectional view taken along line 5—5 of FIGURE 4; and

FIGURE 6 is a fragmentary sectional view taken along line 6—6 of FIGURE 5.

With particular reference to FIG. 1 of the drawing, the washing mechanism of this invention is depicted in combination with a vehicle having a windshield 10. The vehicle is equipped with a windshield cleaner assembly comprising a wiper arm 11, which is connected to a suitable shaft, not shown, by which means oscillatory movement may be imparted to the arm 11. The outer end of the arm 11 is detachably connected to a wiper blade 12, which may be of conventional design. In the present invention, the wiper arm 11 supports a nozzle 13, through which liquid solvent may be sprayed onto the windshield 10. Preferably, liquid solvent is drawn from a reservoir 14 and forcibly ejected through the nozzle 13 by means of a pump 15, which interconnects the reservoir 14 and the nozzle 13 through a line, or conduit, 16.

The pumping mechanism may be of the character disclosed in our copending application, Serial No. 487,197, filed of even date herewith, now Patent No. 2,898,644. Thus, the pumping means 15 is connected by a conduit 17 to a valve assembly 18, which may include a dashboard control knob 19. The valve 18 is connected by a conduit 20 with a source of fluid under pressure 21. In addition, the valve assembly 18 may constitute a part of a coordinated washer and wiper control valve unit, as disclosed in our copending application, Serial No. 487,196, filed of even date herewith, now Patent No. 2,847,978.

With particular reference to FIGS. 2 and 3, a modified embodiment of this invention will be described. As shown in FIGS. 2 and 3, the wiper arm 11 is of channel shape, the outer end thereof being flattened at 22 and having a pair of spaced, inwardly extending ears, or tangs, 23 and 24. The washer line 16 is situated within the channeled arm 11, and extends through an opening 25 whereby a portion thereof lies above the flattened arm portion 22. The line 16 terminates in the nozzle 13 outwardly of the flattened arm portion 22.

The wiper blade 12 preferably includes a flexible backing strip 26, which permits the squeegee element of the blade to conform to the curved vehicular transparency. As shown in FIG. 2, the backing strip 26 is rigidly connected to a pivot pin 27, which projects through an opening 28 in the flattened arm portion 22. The arm and blade may be detachably connected by means of a spring washer 29.

It should be noted that the pivot pin 27 is connected to the blade 12 at unequal distances from the ends thereof. In particular, the longer portion of the blade 12 extends outwardly of the pin 27. In this manner, the frictional resistance encountered by the blade as it traverses the windshield, which frictional resistance is caused by the wiping pressure applied to the arm, will cause the blade 12 to pivot relative to the arm 11 on an axis substantially normal to the longitudinal axis of the blade, as shown in FIG. 3. In particular, the long end of the blade 12 will lag behind the arm 11, as depicted in FIGS. 1 and 3. The tangs 23 and 24 limit pivotal movement of the blade relative to the arm. Pivotal movement of the blade relative to the arm, while the nozzle 13 is disposed in alignment with the arm, results in an arrangement whereby the liquid solvent will always be discharged ahead of the blade 12 during oscillatory movement thereof. Thus, the water will be distributed over the windshield surface to be cleaned by the nozzle, rather than by the blade as in prior washer arrangements.

With reference to FIGS. 4 through 6, the preferred embodiment of the present invention is disclosed. In FIGS. 4 through 6, the wiper arm 11 is of channel shape throughout its length. The outer end of the arm 11, as shown in FIG. 5, is slightly spread, and the side flanges thereof are formed with aligned openings 30 and 31. The backing strip 26 of the blade 12 is permanently attached to a block 32, so that the blade extends substantially equal distances in each direction therefrom. The block 32, as shown in FIG. 5, is formed with a transverse opening 33 having an enlarged opening 34 in the medial portion thereof.

The washer line 16, which is received within the channel arm 11, terminates in the block 32. The open end thereof communicates with the counterbored opening 34. The blade and arm are detachably connected by means of a pin 35, reduced end portions of which are received in the openings 30 and 31 of the arm 11. The larger diameter portion of the pin 35 slidably supports the block 32 for limited transverse movement relative to the arm 11. The reduced diameter portions of the pin 35 receive sealing washers 36 and 37, respectively.

As seen in FIGS. 5 and 6, the counterbored portion 34 is connected with jets 38 on side portion 40 of the block 32 and also with jets 39 on side portion 41 of the block. The washers 36 and 37 are arranged to sealingly engage the sides 40 and 41, respectively, of the block 32 so as to alternately seal the jets 38 and 39. Operation of the modified embodiment of FIGS. 4 to 6 results in liquid solvent being discharged onto the windshield immediately adjacent the blade 12 and always leading blade movement. Thus, when the wiper arm imparts movement to the blade, the block 32 will slide on the pin 35 and uncover the jets adjacent the leading side of the blade as depicted in FIG. 5.

From the foregoing, it is apparent that the present invention provides unique washer discharge nozzle arrangement wherein the liquid solvent is impinged upon the windshield immediately adjacent the blade, and always ahead of the blade during oscillatory movement thereof in both directions. The improved results of such a washing system are readily apparent, and the two embodiments disclosed in this application are of extremely simple construction.

While the embodiments of the present invention as herein disclosed, constitute preferred forms, it is to be understood that other forms might be adopted.

What is claimed is as follows:

1. A window cleaning system including in combination, an oscillatable cleaner assembly movable back and forth across the surface of said window comprising an arm and a blade, means interconnecting said blade and arm comprising a block attached to said blade, said block having a transverse bore therethrough, and a pin carried by said arm and extending through said bore whereby said blade may move transversely relative to said arm upon reversal of movement of said arm, and nozzle means carried by said block for directing a jet of fluid onto the window surface immediately adjacent said blade and always leading the movement thereof.

2. The combination set forth in claim 1 wherein said block is formed with an internal counterbore which is connected with jets on opposite side surfaces thereof.

3. The combination set forth in claim 2 wherein said pin carries a pair of sealing washers which constitute valves for alternately sealing the jets on opposite sides of said block during oscillatory movement of said cleaner assembly.

4. A window cleaning system including, a cleaner assembly arranged for movement back and forth across the surface of a window comprising an arm and a blade, means interconnecting the blade and the arm for relative transverse linear movement upon reversal of movement of said arm, fluid applying means carried by said cleaner assembly for applying fluid to the surface of the window on opposite sides of the blade, and valve means operable automatically upon relative transverse linear movement between said blade and said arm for causing fluid to be applied only in advance of said wiper blade as said wiper blade moves across the surface of said window.

5. A window cleaning system including, a cleaner assembly movable back and forth across the surface of a window comprising an arm and a blade, means interconnecting the blade and the arm for relative movement upon reversal of the movement of said arm, fluid applying means carried by said blade for applying fluid to the surface of the window on opposite sides of said blade, and valve means carried by said arm and coacting with said fluid applying means upon relative movement between said arm and said blade for causing fluid to be applied only in advance of said blade as the blade moves across the surface of said window.

6. A window cleaning system including, an oscillatable cleaner assembly movable back and forth across the surface of a window, comprising an arm and a blade, means interconnecting the blade and the arm for relative transverse linear movement upon reversal of movement of said arm, fluid applying means carried by said cleaner assembly and including nozzle means for directing fluid immediately onto the surface of said window adjacent said blade on opposite sides thereof, and valve means coacting with said fluid applying means upon relative transverse linear movement between said blade and said arm to open the nozzle means directed forwardly of said arm and close the other nozzle means.

References Cited in the file of this patent

UNITED STATES PATENTS

| | | |
|---|---|---|
| 1,695,342 | Oishei | Dec. 18, 1928 |
| 2,173,021 | Longwell et al. | Sept. 12, 1939 |
| 2,348,502 | Smulski | May 9, 1944 |
| 2,562,819 | Rappl | July 31, 1951 |
| 2,632,911 | Deibel | Mar. 31, 1953 |
| 2,763,023 | Horton | Sept. 18, 1956 |